United States Patent [19]
Ikeuchi et al.

[11] Patent Number: 5,964,515
[45] Date of Patent: Oct. 12, 1999

[54] INDICATING INSTRUMENT FOR VEHICLE

[75] Inventors: Hirofumi Ikeuchi, Kariya; Tsutomu Yoshikawa, Chita-gun; Takao Yagami, Nagoya; Hirokazu Shibata, Okazaki, all of Japan

[73] Assignee: Denso Corporation, Kariya, Japan

[21] Appl. No.: 08/859,099

[22] Filed: May 20, 1997

[30] Foreign Application Priority Data

| May 21, 1996 | [JP] | Japan | 8-126048 |
| May 28, 1996 | [JP] | Japan | 8-133881 |
| Apr. 8, 1997 | [JP] | Japan | 9-089717 |

[51] Int. Cl.⁶ ........................... G01D 11/28
[52] U.S. Cl. .............. 362/26; 362/30; 362/226; 362/276; 116/286; 116/288
[58] Field of Search .......... 362/23, 26–31, 362/85, 276, 294, 373, 226; 116/62.1, 62.4, 286–288, DIG. 36

[56] References Cited

U.S. PATENT DOCUMENTS

| 1,786,768 | 12/1930 | Moorhouse | 362/23 |
| 2,069,894 | 2/1937 | Mattman | 362/26 |
| 2,816,213 | 12/1957 | McIntosh | 362/23 |
| 3,223,833 | 12/1965 | Protzmann | 362/26 |
| 3,514,940 | 6/1970 | Keane, Jr. et al. | 362/26 |
| 3,561,145 | 2/1971 | Shotwell | 362/26 |
| 3,603,779 | 9/1971 | Horne et al. | 362/23 |
| 3,609,336 | 9/1971 | Coppola | 362/23 |
| 3,761,703 | 9/1973 | Mund et al. | 362/26 |
| 4,656,561 | 4/1987 | Shinbo et al. | 362/30 |
| 5,420,710 | 5/1995 | Nanbu | 349/62 |
| 5,422,751 | 6/1995 | Lewis | 349/59 |

FOREIGN PATENT DOCUMENTS

| 7-107490 | 11/1995 | Japan . |
| 8-189844 | 7/1996 | Japan . |

*Primary Examiner*—Alan Cariaso
*Attorney, Agent, or Firm*—Pillsbury Madison & Sutro LLP

[57] ABSTRACT

A straight cold cathode fluorescent lamp is detachably held at the back of a dial plate by a plurality of fork-shaped holders to illuminate a plurality of scales formed on the front surface of the dial plate and accommodated in the reflector which is also detachably fixed to a casing of the indicator instrument. A circuit board is also detachably fixed to the reflector.

18 Claims, 16 Drawing Sheets

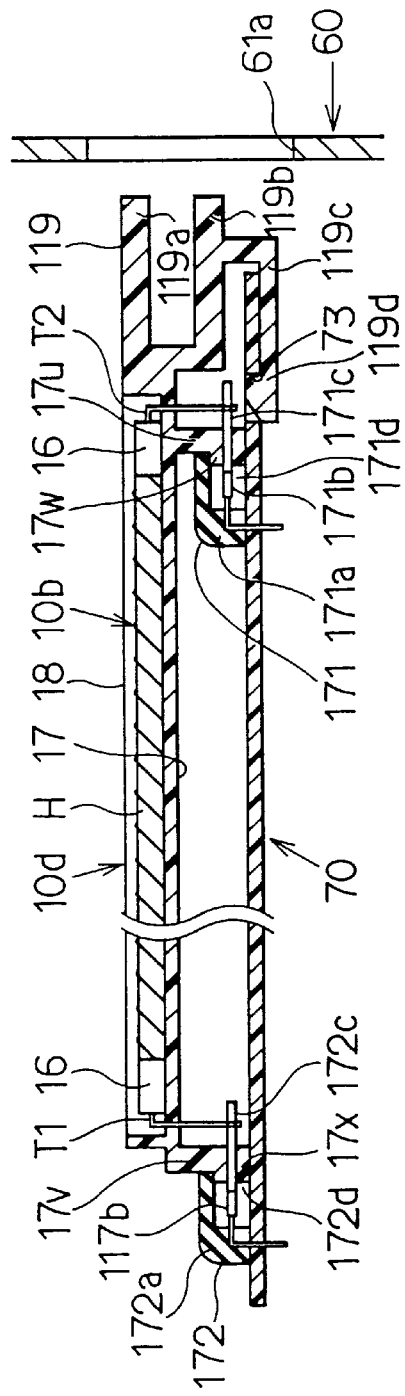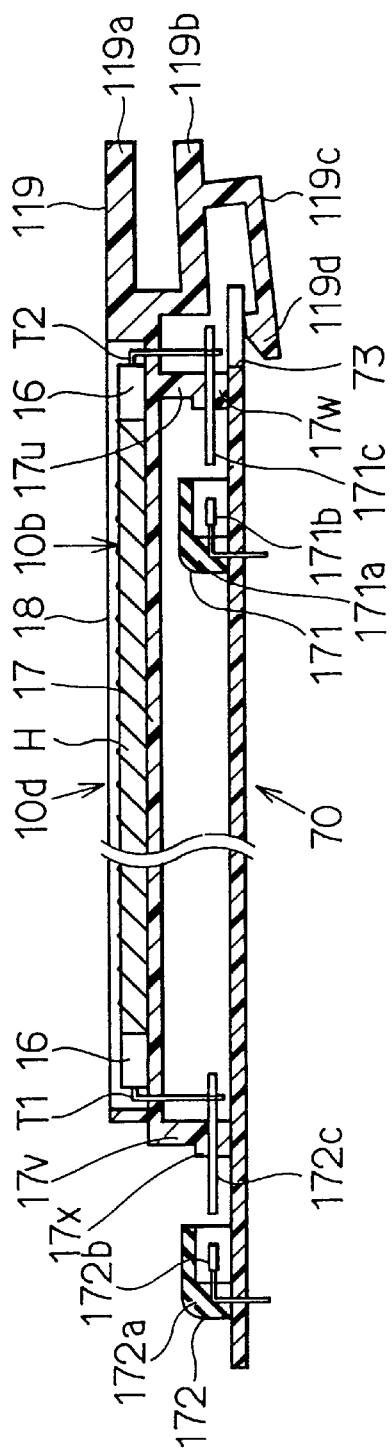

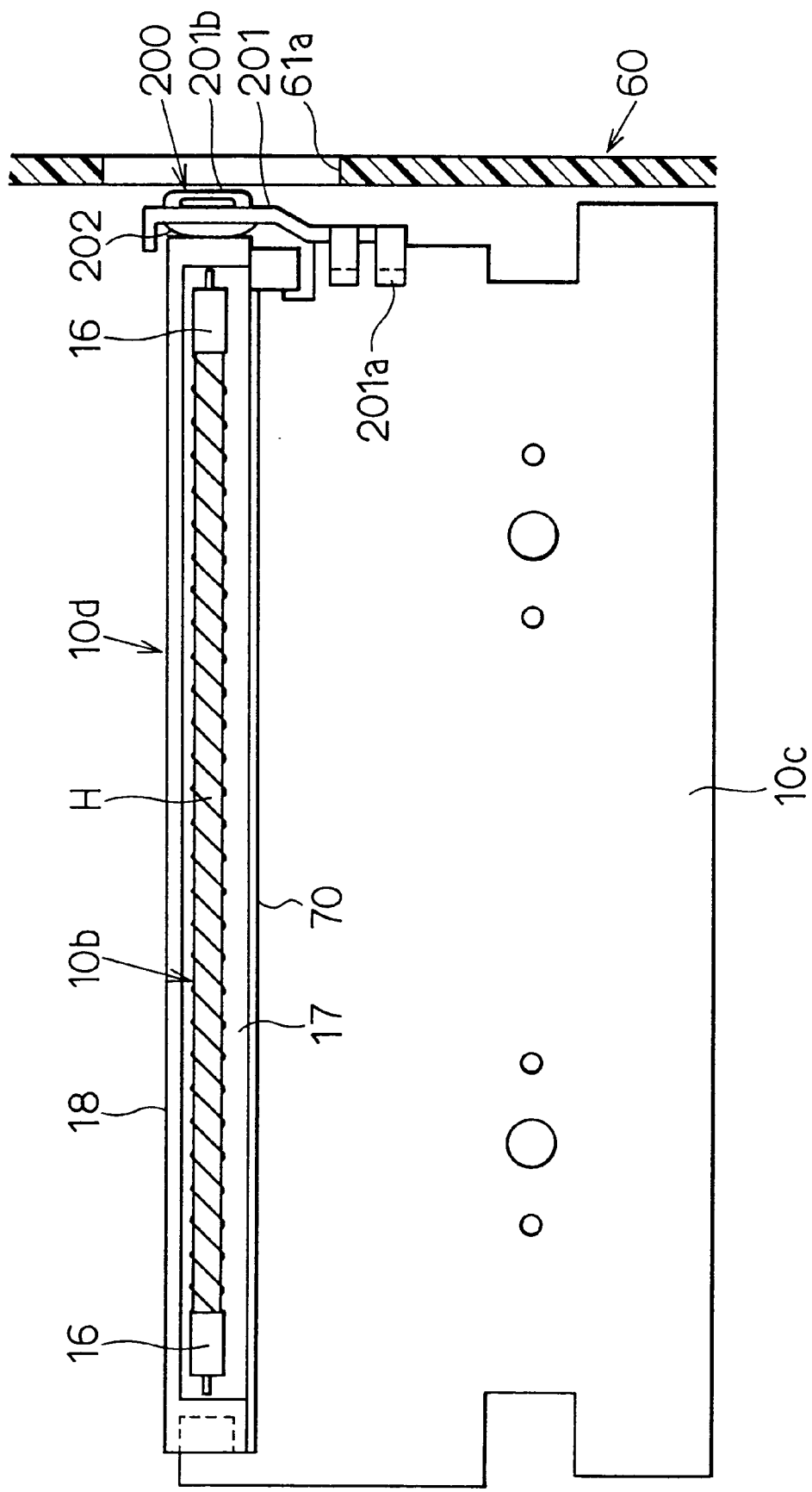

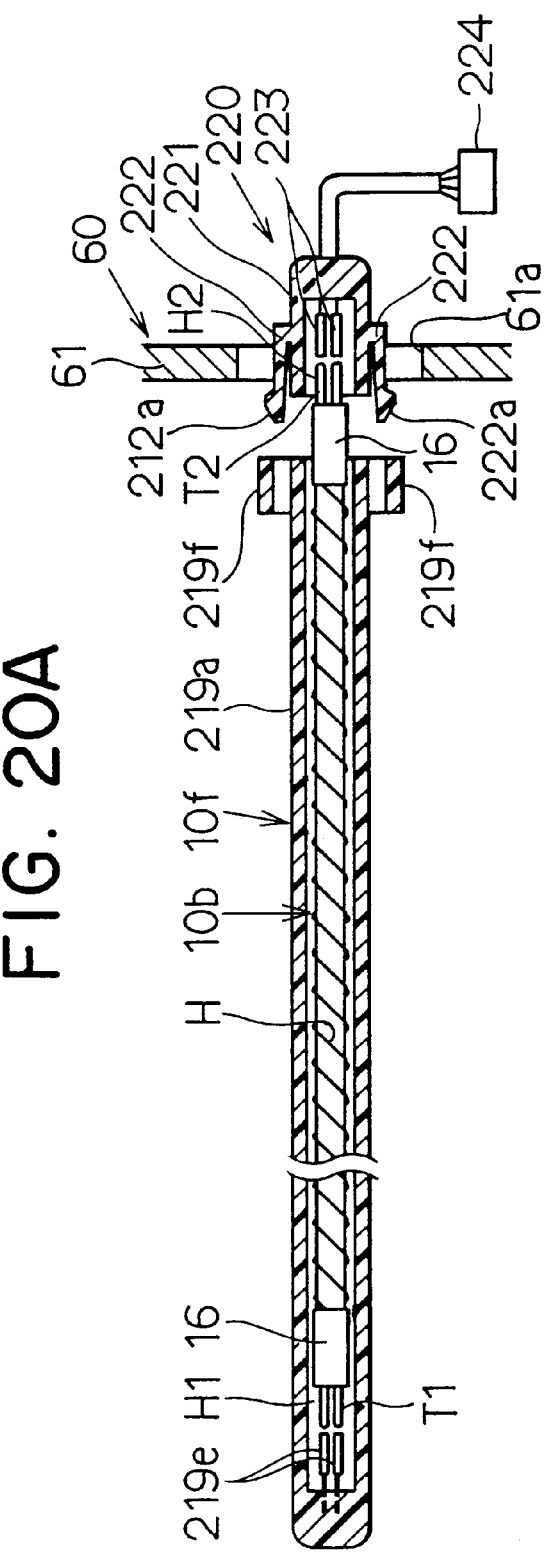
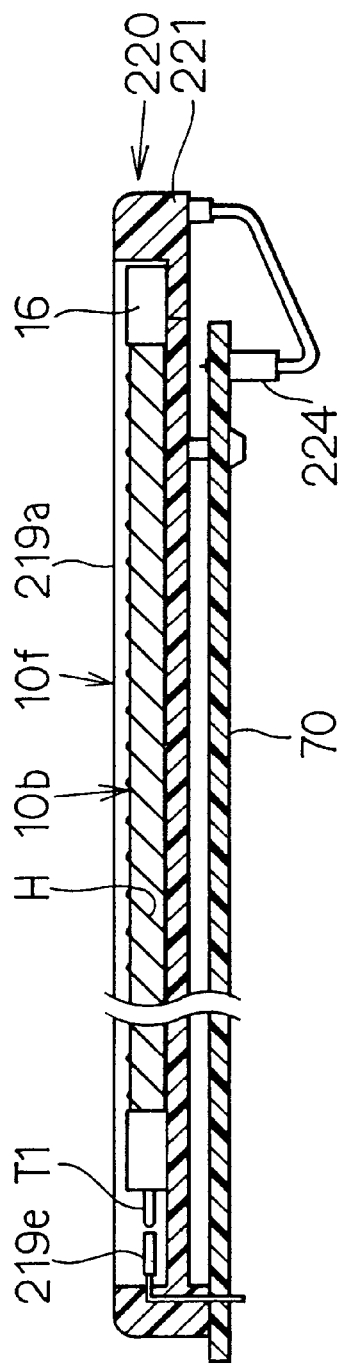
FIG. 20A
FIG. 20B

5,964,515

INDICATING INSTRUMENT FOR VEHICLE

BACKGROUND OF THE INVENTION

1. Field of the Invention

The present invention relates to an indicating instrument for various uses and, particularly, a vehicular indicating instrument having a light source such as a cold cathode fluorescent lamp driven by high voltage power.

2. Description of the Related Art

JPB2-7-107490 disclose s an indicating instrument which has a circular cold cathode fluorescent lamp for illuminating a dial plate and indicators. Because the cold cathode fluorescent lamp is circular, it is necessary to provide various types and sizes of cathode fluorescent lamps for a plurality of types of indicating instruments.

SUMMARY OF THE INVENTION

The present invention has an object of providing an improved indicating instrument which has a simple structure and can be used for various types of vehicles.

For this object, an indicating instrument for a vehicle has a generally straight lamp extending in the longitudinal direction of the dial plate, a light conducting plate disposed on the back surface of the dial plate, and a reflector for accommodating the light source and reflecting light of the light source to the light conducting plate.

Another object of the present invention is to provide an indicating instrument having a lamp which is easily replaced.

For this object, an indicating instrument has, in addition to the above structure, means detachably fixed to the casing of the indicator instrument to combine the light source and the reflector. Preferably, a circuit board is detachably fixed to the reflector.

In addition to the above feature, an indicating instrument preferably has a detachable connector, which has a terminal plate connecting the light source to a high-voltage source and other terminal plates, and the terminal plate is disposed at a distance large enough to insulate it from other terminals.

Another object of the present invention is to provide an indicating instrument wherein the light source can be removed by an action in the longitudinal direction of the casing.

For this object, a fixing member is fixed to the casing for detachably holding the reflector in the longitudinal direction and an opening is formed in the casing so that the reflector and light source can pass through the opening when they are removed from the casing in the longitudinal direction.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 15A and 15B are cross-sectional views illustrating a lamp unit including a lamp, a reflector and a circuit board;

FIG. 17 is a front view of the main portion illustrated in FIG. 16 viewed from a portion indicated by an arrow B in FIG. 16;

FIGS. 20A and 20B are cross-sectional views illustrating a lamp unit including a lamp and a reflector according to a fifth embodiment of the present invention;

DETAILED DESCRIPTION OF THE PREFERRED EMBODIMENTS

First Embodiment

An indicating instrument 10 according to a first embodiment is described with reference to FIGS. 1–6.

Figure 1:
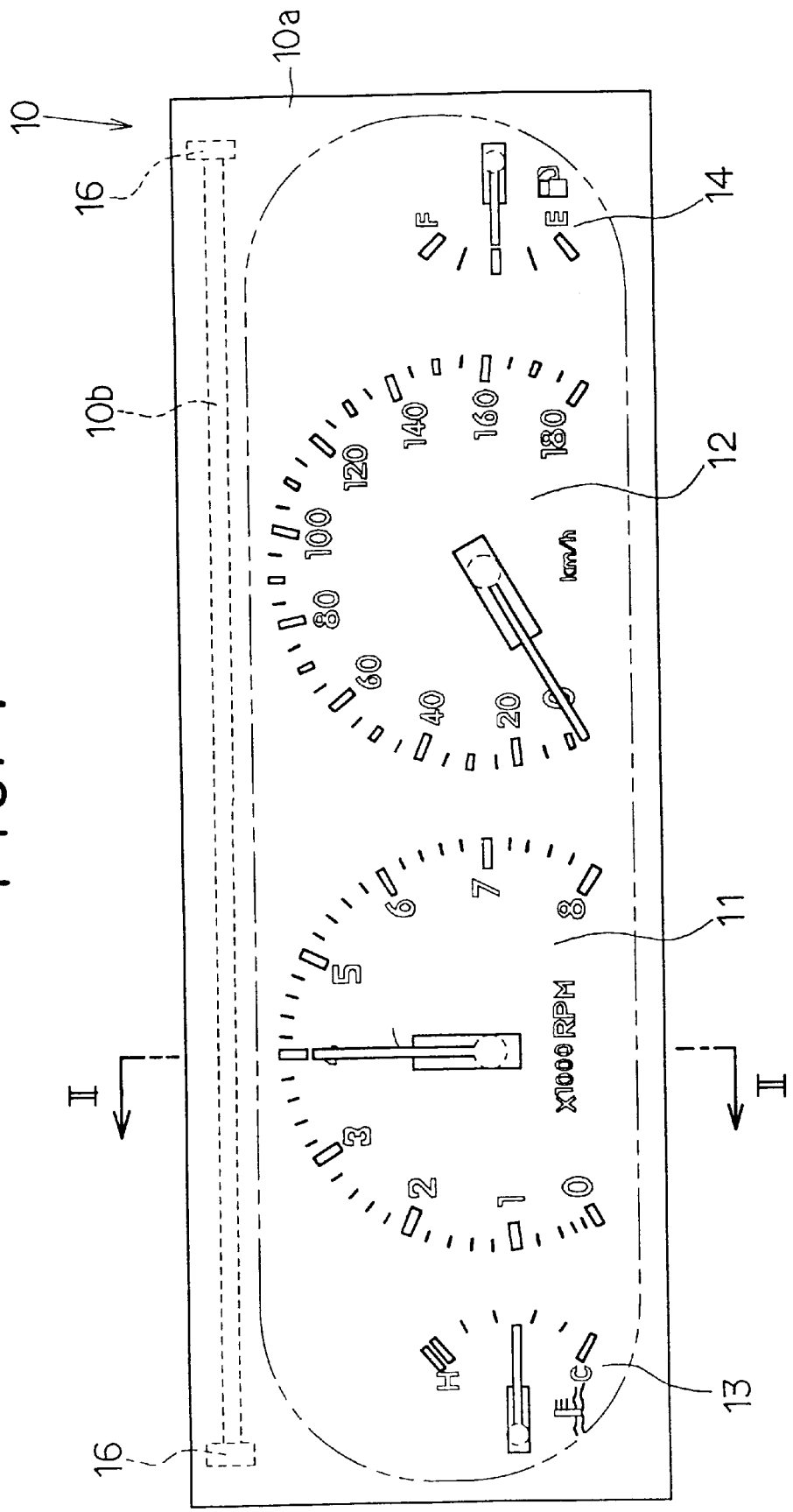
FIG. 1 is a front view of an indicating instrument according to a first embodiment of the present invention.
Figure 2:
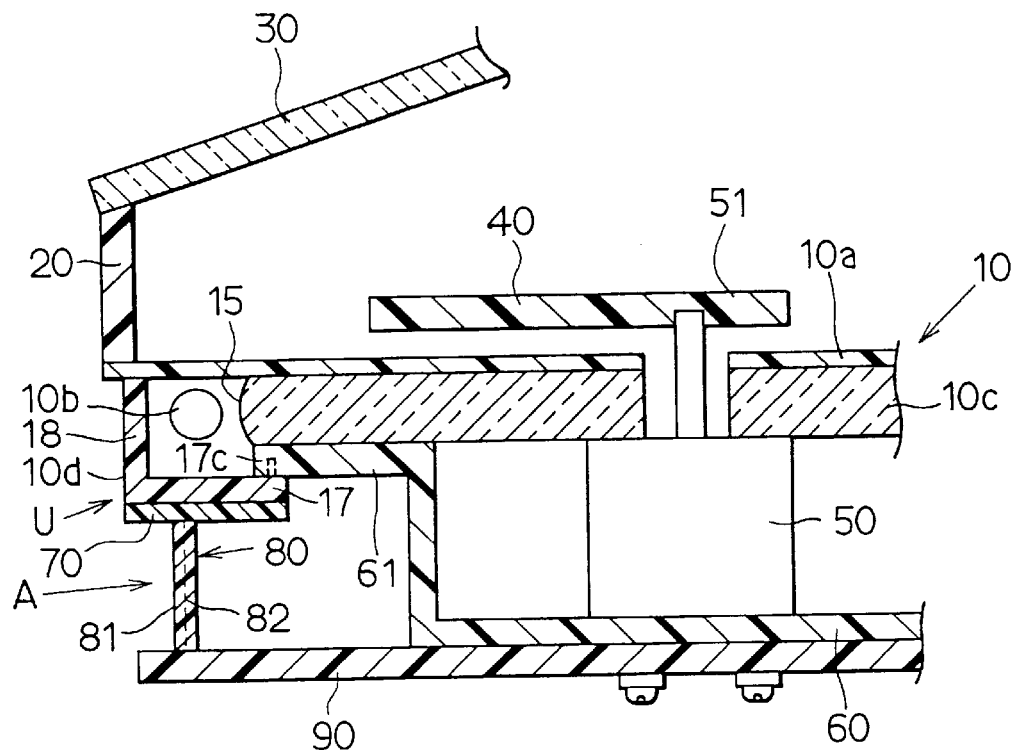
FIG. 2 is a cross-sectional view taken along a line II—II of FIG. 1.

As shown in FIGS. 1 and 2, the indicating instrument 10 is composed of a dial plate 10a, a straight cold cathode fluorescent lamp 10b, a light conducting plate 10c, a light reflector 10d which has an L-shaped cross-section, a circuit board 70, a connector 80 and a circuit board 90.

The dial plate 10a has a black surface on which scales 11, 12, 13 and 14 of engine rotational speed (r.p.m.), vehicle speed (km/h), engine coolant temperature (H, C) and fuel amount (F,E) in the fuel tank are respectively formed in a well-known manner. The black surface is surrounded by an annular wall member 20 and covered by a transparent front panel 30.

Figure 5:
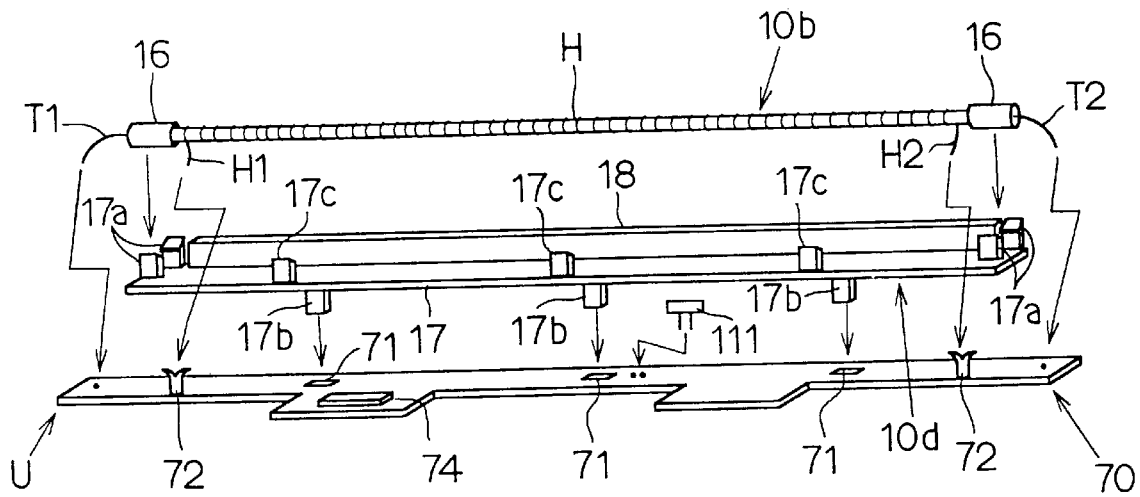
FIG. 5 is an exploded view of a lamp unit shown in FIG. 1.
Figure 6:
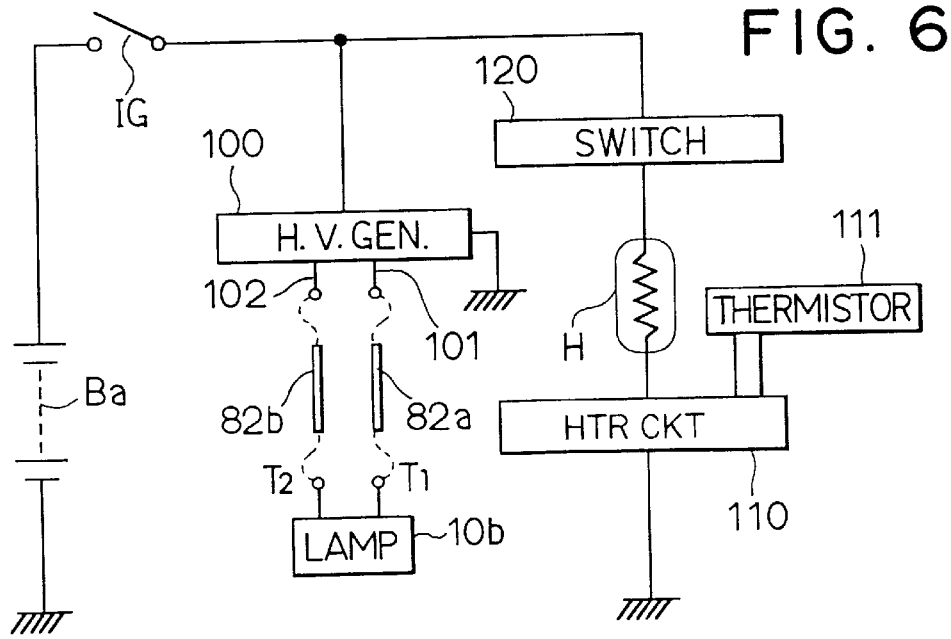
FIG. 6 is a circuit diagram of the indicating instrument according to embodiments of the present invention.

The lamp 10b is disposed behind the dial plate 10a in the longitudinal direction of the dial plate 10a at an upper portion (left in FIG. 2) thereof and detachably fixed to a wall 17 of the reflector 10d by a pair of cylindrical holders 16 and a pair of forked clamps 17a as shown in FIGS. 1 and 5. The lamp 10b is long enough to illuminate all the scales 11–14 and lamp 10b is provided with a heat wire H wound on the surface thereof over the full length of the lamp 10b as shown in FIG. 5 and electrically connected as shown in FIG. 6.

The light conducting plate 10c is made of an acrylic resin and fixed to the back of the dial plate 10a under the lamp 10b so that the light incidence portion 15 thereof faces the lamp 10b. The back of the light conducting plate 10c is frosted to diffuse light so that light coming into the conducting plate 10b from the light incidence portion 15 can be diffused by the back of the light conducting plate 10c and conducted to the scales 11, 12, 13 and 14 effectively.

The reflector 10d is detachably fixed to the dial plate 10a and a casing 60 to cover the lamp 10b. As shown in FIG. 5, the reflector 10d has a plurality of claw members 17b extending toward the circuit board 70, a plurality of claw members 17c extending in the direction opposite to the circuit board 70 (toward the casing 60) and a side wall 18.

The scales 11, 12, 13 and 14 are equipped with indicators respectively, which are driven by driving units. An indicator 40 and a driving unit 50 for the engine r.p.m. scale 11 are shown in FIG. 2.

The driving unit 50 is housed in the casing 60 and has a rotary shaft 51 extending through a hole of the dial plate 10a to the front thereof to support the indicator 40.

The casing 60 has a flange 61, which has a plurality of slits into which the claw members 17c of the reflector 10d are fitted as shown in FIG. 2. At the same time, the side wall 18 of the reflector 10d abuts against the back of the dial plate 10a.

As shown in FIG. 5, the circuit board 70 has a plurality of openings 71 receiving the claw members 17b of the reflector 10d so that the circuit board 70 can be detachably fixed to the back of the reflector 10d. The circuit board 70 has a pair of terminals T1 and T2 connected to the lamp 10b, a pair of forked terminals 72 which hold the terminals H1 and H2 in the arms thereof at the opposite ends of the circuit board 70 to make a electrical connection and a connector portion 74 into which a connector 80 (see FIG. 4) is inserted, as shown in FIG. 5. Thus, the lamp 10b, reflector 10d and circuit board 70 compose a lamp unit U.

When the lamp 10b is going to be replaced due to a breakdown thereof, the lamp unit U is detached from the casing 60. Therefore, the replacement of the lamp 10b can be carried out very easily.

Figure 3:
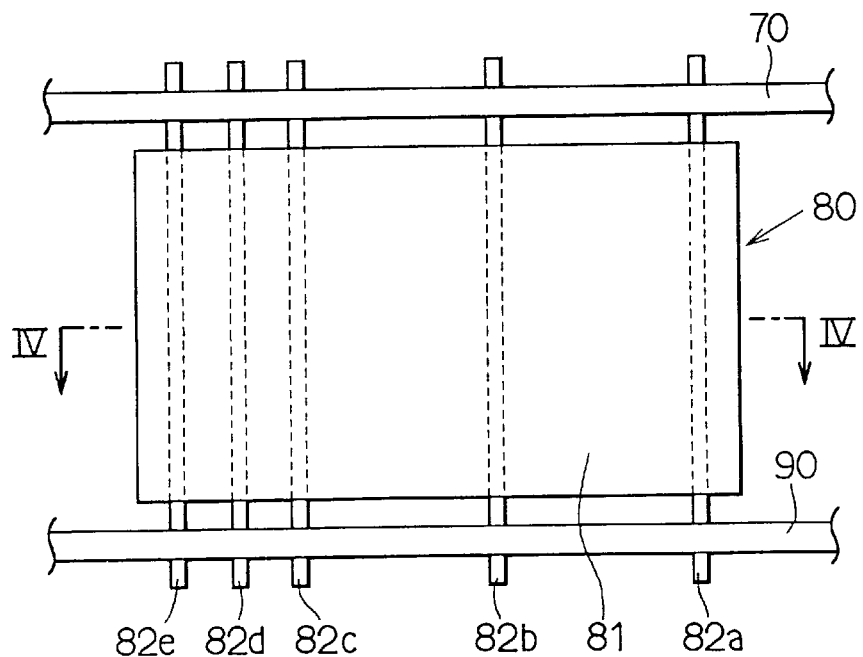
FIG. 3 is a front view illustrating a main portion of a connector of an indicating instrument according to the first embodiment viewed from a direction indicated by an arrow A of FIG. 2.
Figure 4:
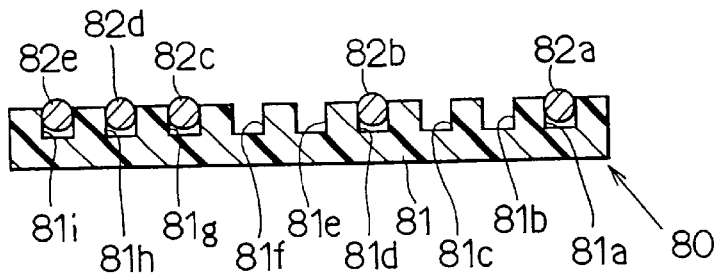
FIG. 4 is a cross-sectional view illustrating the connector taken along a line IV—IV of FIG. 3.

As shown in FIGS. 3 and 4, the connector 80 is composed of a case 81 made of an insulating material and a terminal unit 82 inserted in the case 81 and is disposed between both circuit boards 70 and 90.

As shown in FIGS. 3 and 6, the terminal unit 82 has a terminal plate 82a connected between the terminal 101 of the high-voltage-power generator 100 and the terminal T1 of a circuit board 70 connected to the lamp 10b, and another terminal plate 82b connected between the terminal 102 of the high-voltage-power generator 100 and the terminal T2 of the circuit board 70 connected to the lamp 10b.

As shown in FIGS. 3 and 4, the terminal unit is composed of a plurality of terminal plates 82a, 82b, 82c, 82d and 82e which are disposed respectively in grooves 81a, 81d, 81g, 81h and 81i formed in the case 81 and soldered to respective terminals of the circuit board 70 and 90. An interval of the terminal plates 82a, 82b and 82c between each other is three times as long as an interval of the terminal plates 82c, 82d and 82e between each other, because the terminal plates 81a and 82b are connected to the terminals 101 and 102 of the high-voltage-power generator 100 to supply the high-voltage power to the lamp 10a as shown in FIG. 6. The other terminal plates 82c, 82d and 82e are connected to the ignition switch IG and the driving unit 50 respectively through the circuit boards 70 and 90.

The circuit board 90 is fixed to the back of the casing 60 in parallel with the circuit board 70 by a plurality of bolts and has the high-voltage-power generator 100 thereon, which has the terminals 101 and 102.

The high-voltage-power generator 100 is powered by a battery Ba through an ignition switch IG and generates, across the terminals 101 and 102, electric power of a voltage between hundreds of volts and tens of thousand volts at a frequency of tens of kilohertz.

A heater circuit 110 supplies the heater H with electric power according to a signal of temperature of the lamp 10b sent from a thermistor 111 when a normally-closed switch 120 made of a thermosensitive material is closed, and the cold cathode fluorescent lamp 10b illuminates the dial plate 10b through the light conducting plate 10c. The thermistor 111 has a pair of lead terminals, which are soldered to the circuit board 70. The terminals T1 and T2 of the lamp 10b are also soldered to the circuit board 70 at opposite sides thereof. As the heater H heats the lamp 10b and temperature of the surface of the lamp 10b exceeds a certain value which indicates a normal temperature condition, the switch 120 is turned off.

The switch 120 is disposed in a space sealed by the dial plate 10a, reflector 10d, light conducting plate 10c and the flange 61 of the casing 60 in order to keep accurate switching performance.

Figure 7:
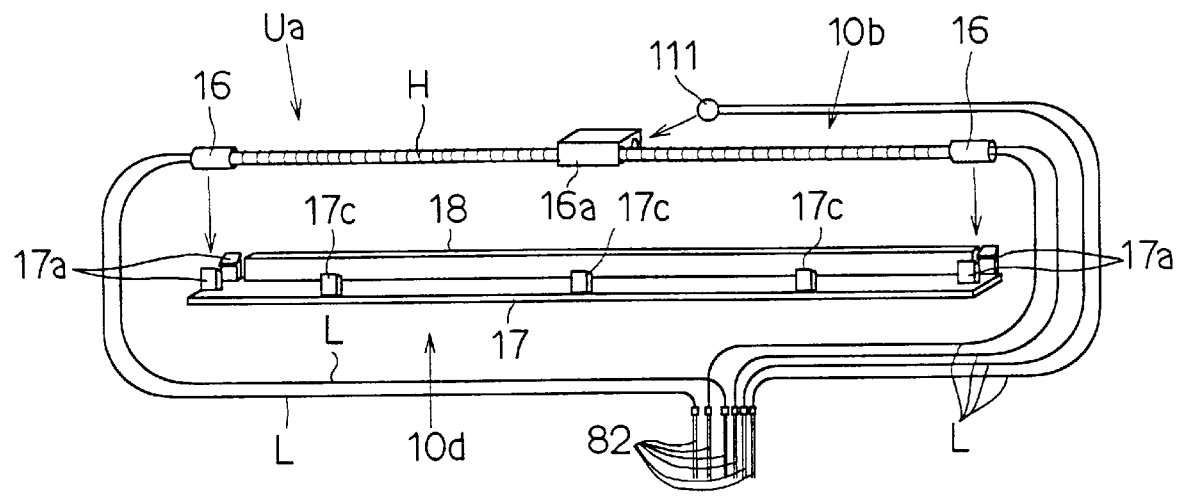
FIG. 7 is a main part of a variation of the lamp unit shown in FIG. 5.

A variation of the indicating instrument according to the first embodiment is shown in FIG. 7. The circuit board 70 is omitted, and the cold cathode fluorescent lamp 10b, the heater H and the thermistor 111 are respectively connected to the terminal plates 82 of the connector 80 by a plurality of lead wires L. The thermistor 111 is held by a holder 16a which is mounted on the middle of the lamp 10b. Other portions are the same in structure as the indicating instrument according to the first embodiment.

Second Embodiment

Figure 9:
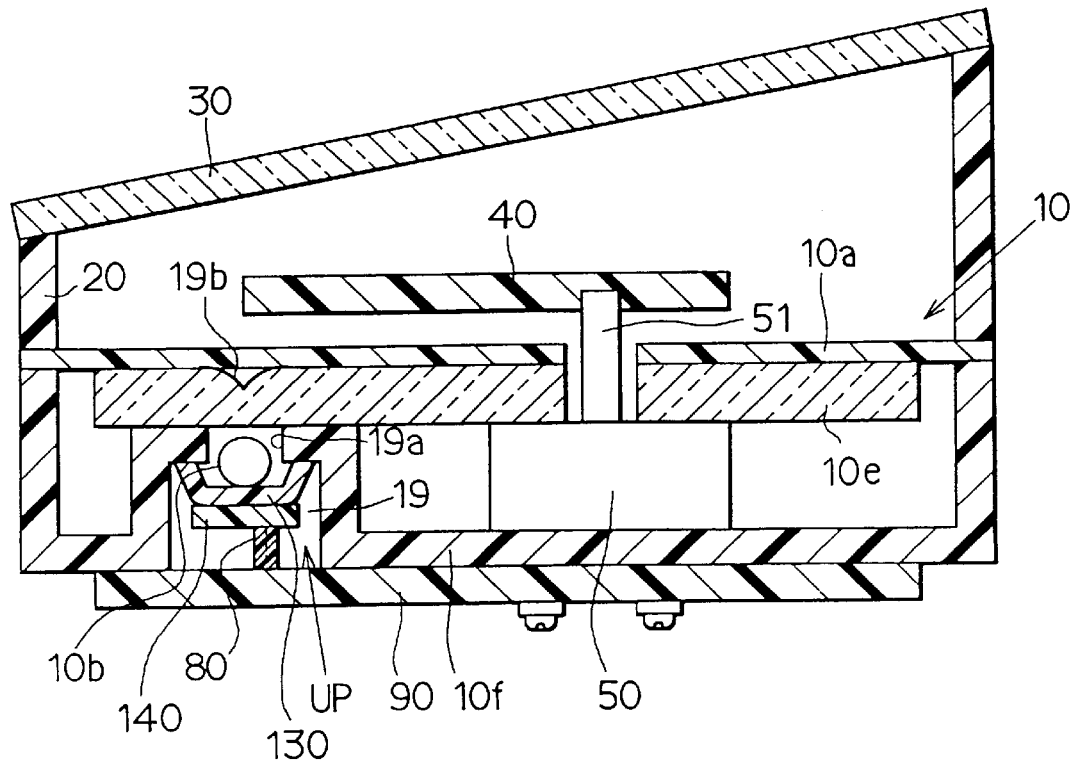
FIG. 9 is a cross-sectional view of a main portion of the indicating instrument taken along a line IX—IX of FIG. 8.
Figure 8:
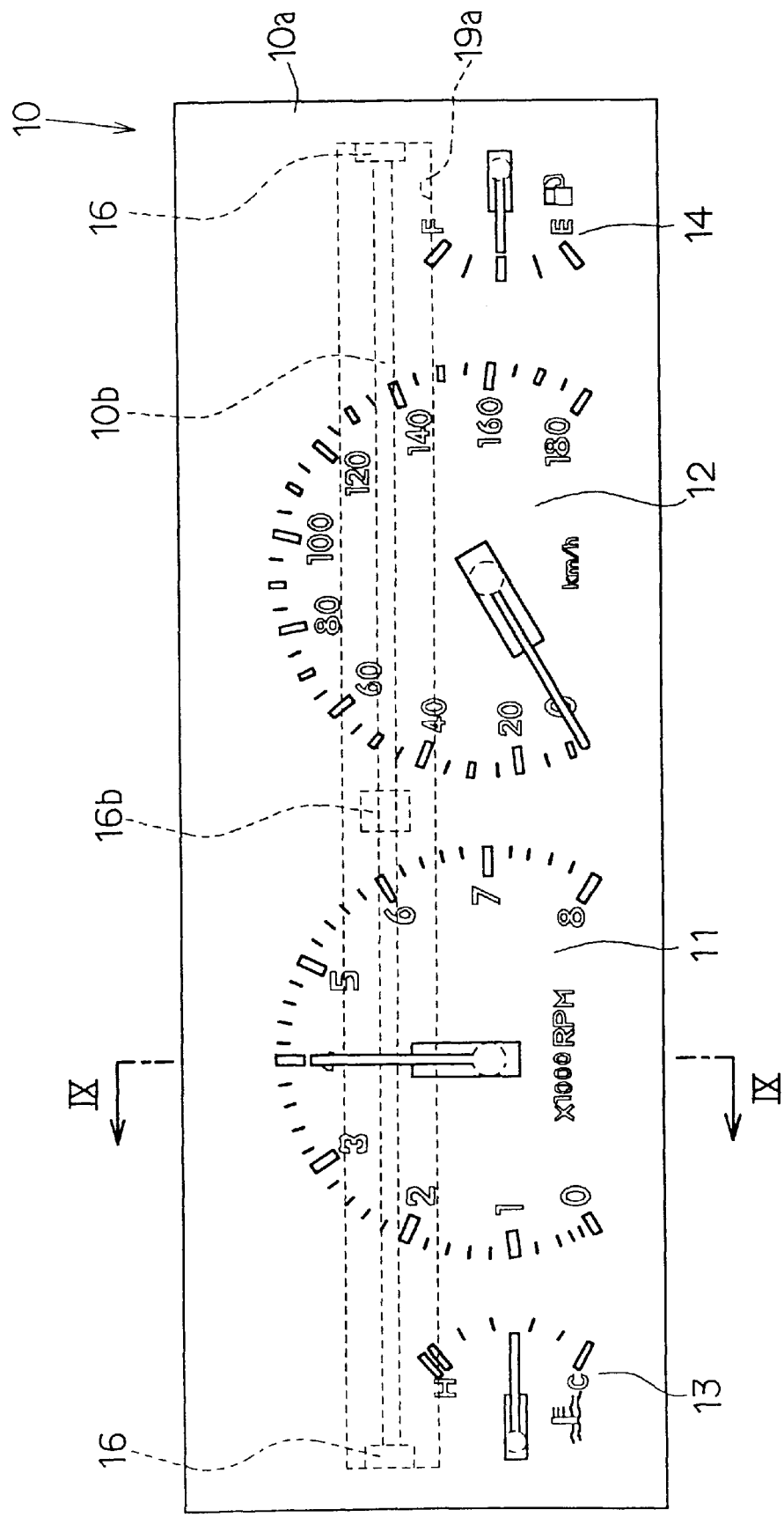
FIG. 8 is a front view illustrating an indicating instrument according to a second embodiment of the present invention.

An indicating instrument according to a second embodiment is described with reference to FIGS. 8–10. The light conducting plate 10c, reflector 10d, casing 60 and circuit board 70 in the first embodiment are replaced with a light conducting plate 10e, a casing 10f, a reflector 130 and a circuit board 140 respectively. Other portions having the same reference numeral as the first embodiment are substantially the same in structure and function, and therefore description is omitted.

The casing 10f has a longitudinal conduit 19 for accommodating the lamp 10b, which faces the light conducting plate 10e through an opening 19a which opens to the light incidence portion of the light conducting plate 10e. The light incidence portion has a reflecting surface 19b facing the lamp 10b on the back thereof. The lamp 10b is secured by the reflector 130; the circuit board 140 is detachably fixed to the back of the reflector 130; and the circuit board 90 is fastened to the casing 10f by screw bolts.

Figure 10:
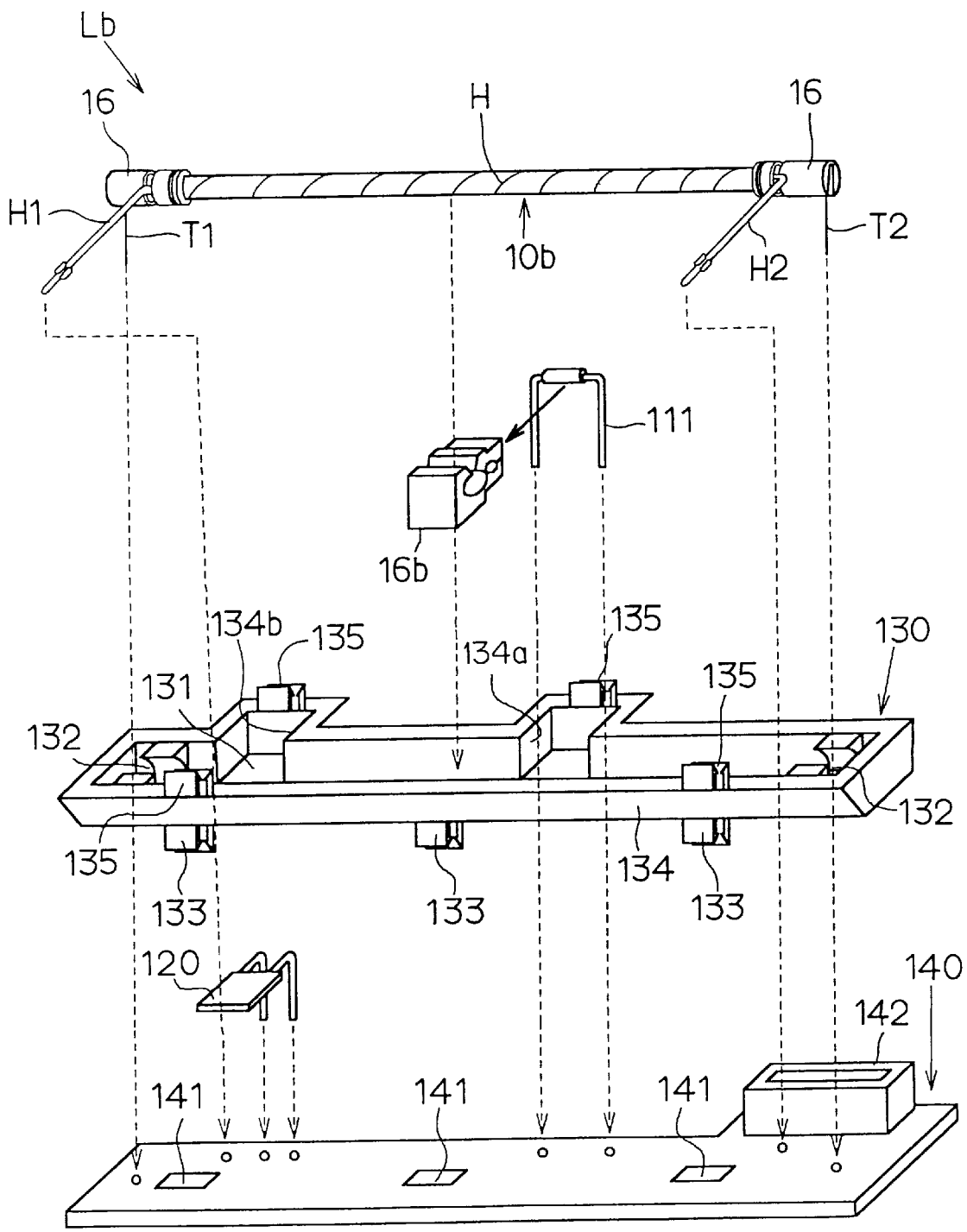
FIG. 10 is an exploded view of a lamp unit of the indicating instrument according to the second embodiment.

As shown in FIG. 10, the reflector 130 has a base plate 131, both a pair of forked members 132 and a plurality of claw members 135 disposed on a surface of the base plate 131 and a plurality of claw members 133 on the opposite surface. The forked member 132 holds the lamp 10b by its own resiliency at opposite ends thereof. The circuit board 140 has a plurality of openings 141 which receive the claw members 133 detachably and a connector portion 142 disposed at a portion adjacent to the reflector 130. The terminals T1, T2 of the lamp 10b, terminals H1, H2 of the heater H and leads of both the thermistor 111 and the switch 120 pass through the base plate 131 of the reflector 130 and are inserted in holes of solder lands and soldered thereto respectively.

The thermistor 111 is held in a groove of a holder 16b separate from a groove holding the lamp 10b. The thermistor 111 and switch 120 are housed in compartments 134a and 134b of the reflector 130 respectively. Thus, the lamp 10b, reflector 130 and circuit board 140 compose a detachable lamp unit Ub.

The connector 80 is connected to the connector portion 142 after assembling of the lamp unit Ub. The reflector 130 is, thereafter, fixed to the casing 10f by the claw members 135 fitted in slits of the casing (not shown) as described before.

If the lamp has to be replaced with a new one, the unit Ub is detached from the casing 10f. It is not necessary that the lamp 10b is strictly straight. The lamp 10b can be a generally straight lamp of some other type such as a xenon lamp. The reflector can be detachably fixed to the light conducting plate or the dial plate also.

The heater H can control the brightness of the lamp by changing wire color or number of turns of the wire in places.

A variation of the connector 80 is described with reference to FIGS. 11–13.

The connector 80 in the first embodiment is replaced with first and second connectors 180 and 190 in the third embodiment.

Figure 11:
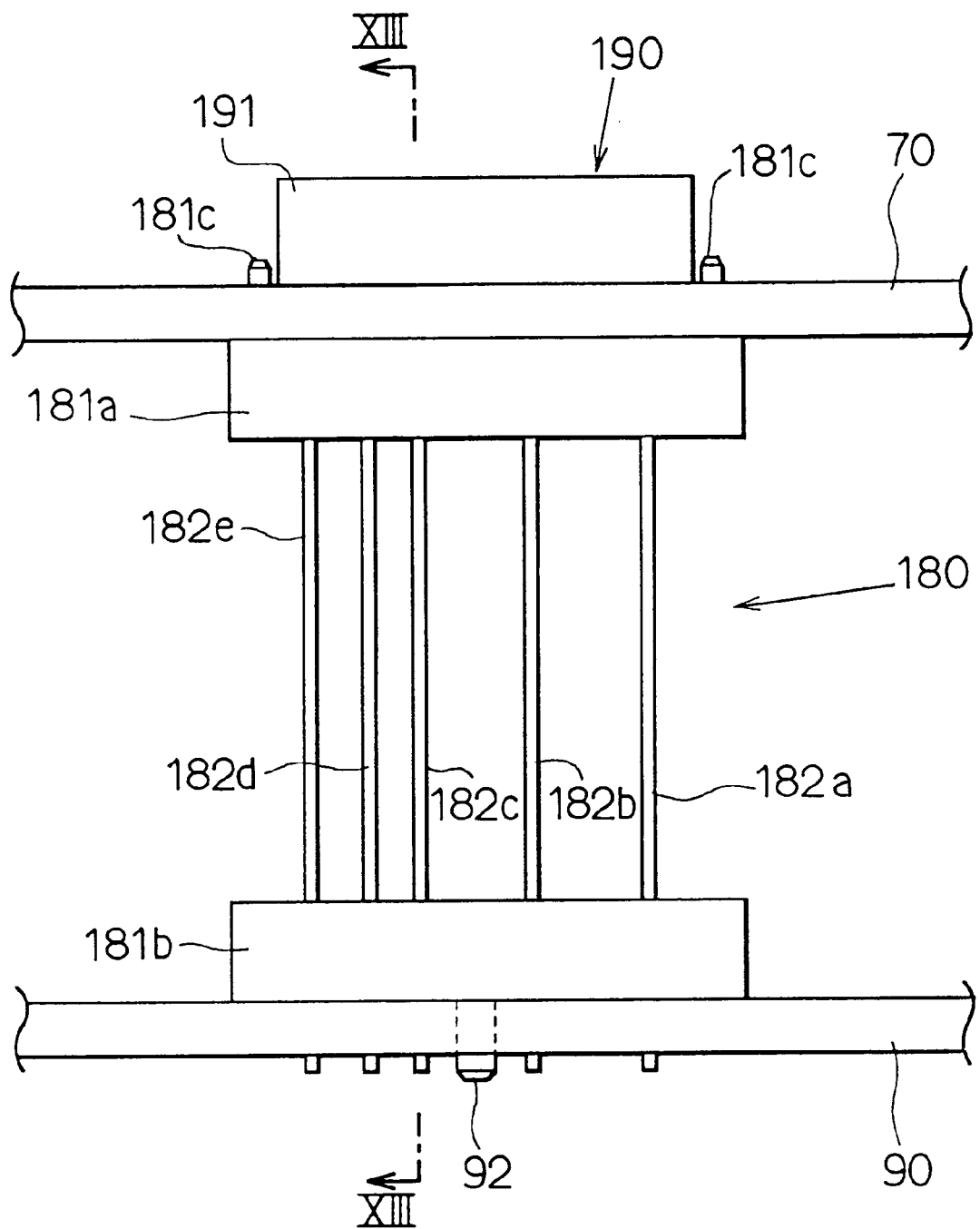
FIG. 11 is a front view illustrating a main portion of a variation of the connector of an indicating instrument according to the embodiments of the present invention.
Figure 12:
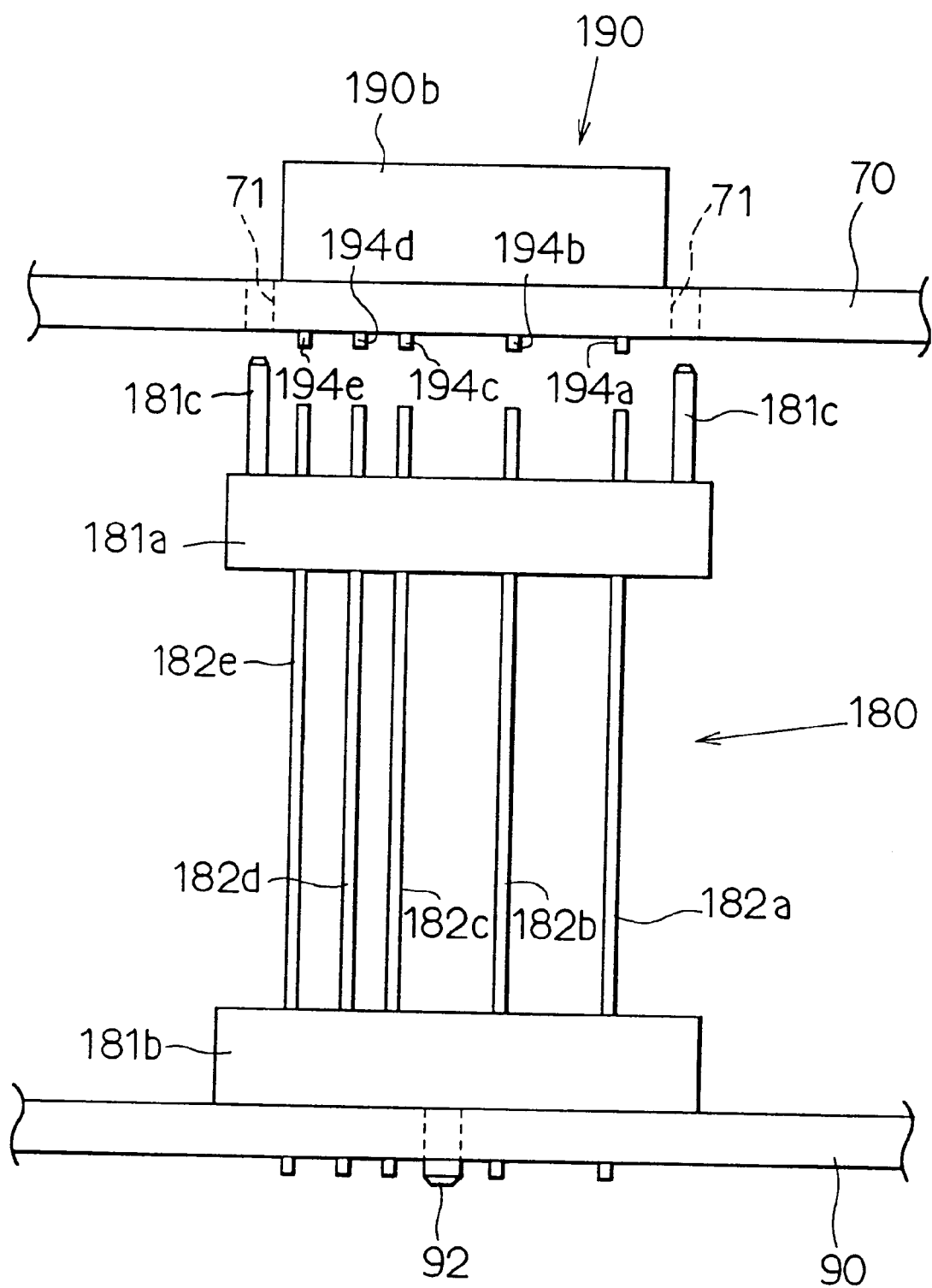
FIG. 12 is a front view of the connector shown in FIG. 11 in the disconnected state.

As shown in FIGS. 11 and 12, the first connector 180 is composed of a pair of connector cases 181a and 181b made of insulating material and a plurality of terminal plates 182a–182e made of conducting material.

The connector case 181a has a pair of fixing pins 181c fitted into through holes 71 formed in the circuit board 70, and the connector case 181b is fixed to the circuit board 90 by a pin 92 or the like.

Figure 13:
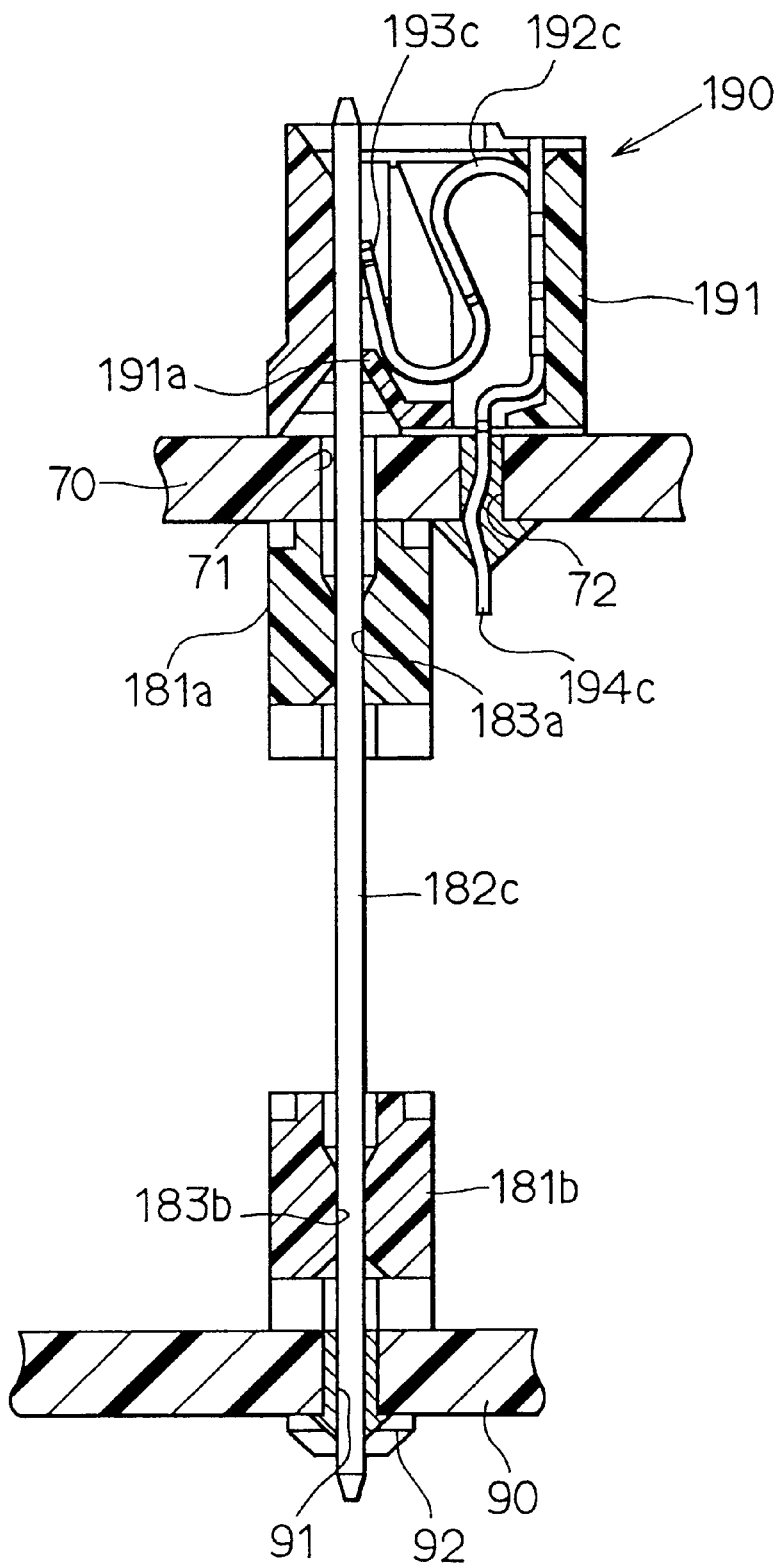
FIG. 13 is a cross-sectional view illustrating the connector taken along a line XIII—XIII of FIG. 11.

As shown in FIG. 13, each of the terminal plates 182a–182e is press-fitted into one of holes 183a and 183b of the connector cases 181a and 181b, and each of the lower ends of the terminal plates 182a–182e is inserted into one of through holes 91 formed in the circuit board 90 and soldered thereto.

As shown in FIG. 13, the second connector 190 is fixed to the upper surface of the circuit board 70 and is composed of a case 191, upper portions of the terminal plates 182a–182e inserted in holes 191a formed in the case 191 and a plurality of S-shaped spring terminals 192a–192e (only 192c is illustrated in FIG. 13) disposed in the case 191 to bias against the terminal plates 182a–182e (the spring terminal 192c biases the terminal plate 182c in FIG. 13) respectively.

The interval between adjacent ones of the terminal plates 182a–182c is the same as the interval between adjacent ones of the terminal plates 82a–82c of the connector 80 of the first embodiment, and the interval between adjacent ones of the terminal plates 182c–182e is the same as the interval between adjacent ones of the terminal plates 82c–82e of the first embodiment. The terminal plates 182a and 182b are connected between the high-voltage power source 100 and the cold cathode fluorescent lamp 10b as in the same manner shown in FIG. 6.

The interval of terminal plates 82a–82e and 182a–182e can be held by an adhesive tape instead of the connector cases 81, 181a, 181b and 191.

Third Embodiment

Figure 14:
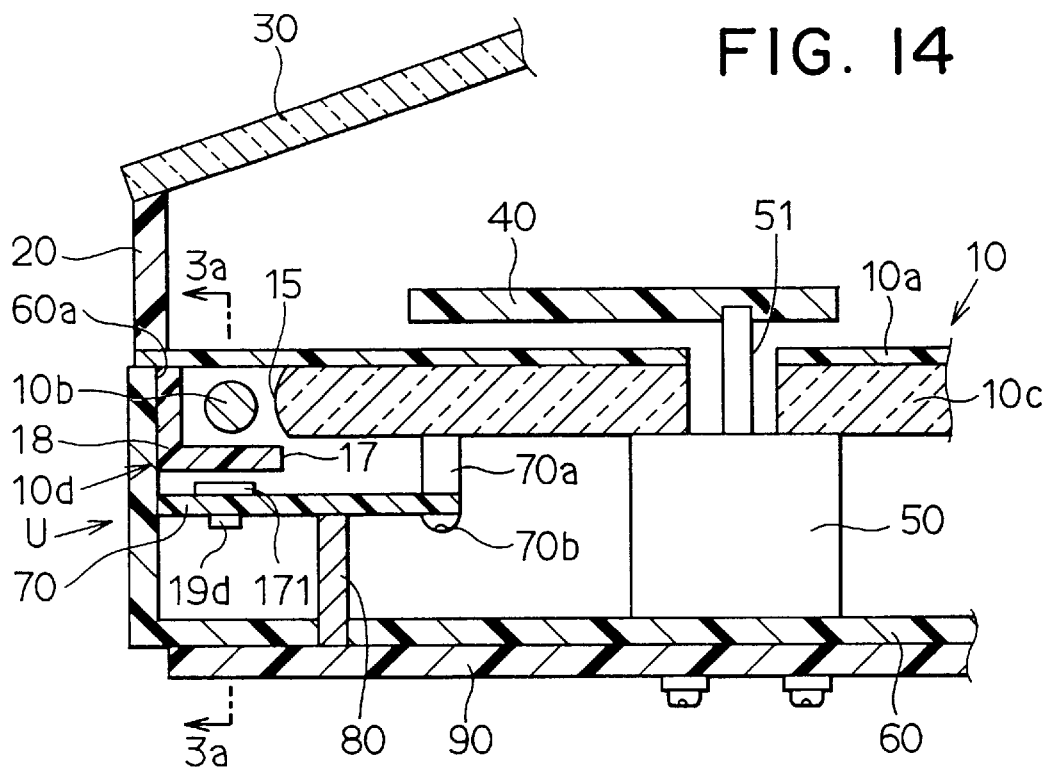
FIG. 14 is a cross-sectional view illustrating a main portion of an indicating instrument according to a third embodiment of the present invention.

An indicating instrument according to a third embodiment is described with reference to FIGS. 14, 15A and 15B. The circuit board 70 abuts the bottom surface of wing members 17u and 17v which are formed on the opposite sides of the wall 17 of the reflector 10d to face the lamp 10b via the wall 17. The circuit board is fixed to the bottom surface of the light conducting plate 10c by a plurality of screw bolts 70b (FIG. 14 shows only one screw bolt) via sleeves 70a.

As shown in FIG. 15A, connectors 171 and 172 are fixed to the upper surface of the circuit board 70 respectively by the left side of the wing members 17u and 17v.

The connector 171 is composed of a connector body 171a and an L-shaped connector terminal 171b. The connector body 171a is fixed to the upper surface of the circuit board 70 and has an open space 171d. The L-shaped connector terminal 171b passes through the circuit board 70 and extends in the open space 171d in parallel with the circuit board 70. The connector pin 171c is disposed to align with the connector terminal 171b and passes through the side wing 17u so that the connector pin 171c can hold the connector terminal 171b detachably. The terminal T2 of the lamp 10b is connected to the connector pin 171c through the wall of the reflector 17.

As shown in FIG. 15A, the open space 171d of the connector body 17a is detachably fitted to a projecting portion 17w of the wing member 17u.

On the other hand, the connector 172 is composed of a connector body 172a and an L-shaped connector terminal 172b. The connector body 172a is fixed to the upper surface of the circuit board 70 and has an open space 172d. The L-shaped connector terminal 172b passes through the circuit board 70 and extends in the open space 172d of the connector body 172a in parallel with the circuit board 70. The connector pin 172c is disposed to align with the connector terminal 172b and passes through the side wing 17v so that the connector pin 172c can hold the connector terminal 172b detachably. The terminal T1 of the lamp 10b is connected to the connector pin 172c through the bottom wall 17 of the reflector 10d. The open space 172d is detachably fitted to a projecting portion 17x of the wing member 17v.

The circuit board 70 has an engagement hole 73 near the right surface of the wing member 17u as shown in FIG. 15B so that a hook 119d of an L-shaped arm 119c, which extends from a hold portion 119 of the reflector 10d, engages the engagement hole 73. The hold portion 119 has two grip ends 119a and 119b extending toward an opening 61a which is formed in the right wall of the casing 60. The two grip ends 119a and 119b bend inward to swing the arm 119c outward when they are compressed by two fingers.

The opening 61a has a size large enough to allow human fingers to pass therethrough.

One end of the connector 80 is connected to the connector terminals 171b and 172b of the connectors 171 and 172 through the circuit board 70, and the other end of the connector 80 is connected to the circuit board 90. The remaining structure is almost the same as the first embodiment.

When the lamp 10b is to be removed, insert fingers into the opening 61a of the casing 60 and compress the grip ends 119a and 119b so that the hook 119d of the L-shaped arm can disengage from the engagement hole 73 as shown in FIG. 15B. Then, pass the hold portion 119 through the opening 61a and pull the grip ends 119a and 119b together with the lamp 10b and the reflector 10d toward the outside of the opening 61a. As a result, the connector pins 171c and 172c and the projecting portions 17w and 17x are subsequently disengaged from the connector terminals 171b and 172b and the open spaces 171d and 172d respectively, and finally the lamp 10b and the reflector 10d can be pulled out of the casing 60.

Fourth Embodiment

Figure 16:
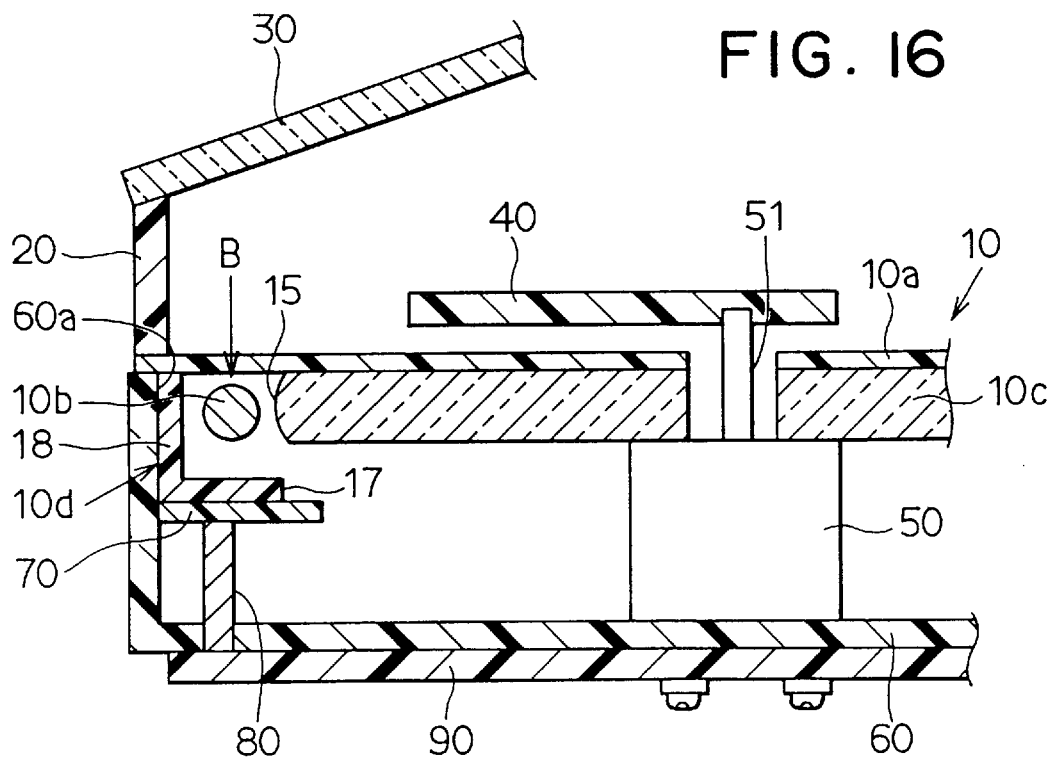
FIG. 16 is a cross-sectional view illustrating a main portion of an indicating instrument according to a fourth embodiment of the present invention.

A fourth embodiment is described with reference to FIGS. 16 and 17.

A reflector 10d is similar to that of the first embodiment, and a hold member 200 is adopted in this embodiment.

As shown in FIG. 17, the hold member 200 is detachably fixed to the right side of the light conducting plate 10c to hold the reflector 10d. The hold member 200 is composed of a plate member 201 made of an elastic resin and a leaf spring 202. The plate member 201 has two pressor plates 201a extending over opposite surfaces of the light conducting plate 10c to hold the light conducting plate 10c at the both sides thereof (only one pressor plate 201a is shown in FIG. 17). A grip portion 201b is formed at an upper portion of the hold member 200.

The leaf spring 202 has a convex surface facing the reflector 10d so that the hold member 200 pushes the reflector 10d toward the left in FIG. 17 elastically against a left side wall of the circuit board 70, thereby holding the reflector 10d. Other portions are substantially the same as those of the third embodiment.

When the lamp 10b is to be removed from the casing 60 through the opening 61a, insert fingers into the casing 60 through the opening 61a, hold the grip portion 201b by fingers to disengage the hold member 200 from the light conducting plate 10c, pull the reflector 10d together with the circuit board 70 and the lamp 10b through the opening 61a out of the casing 10.

Figure 18:
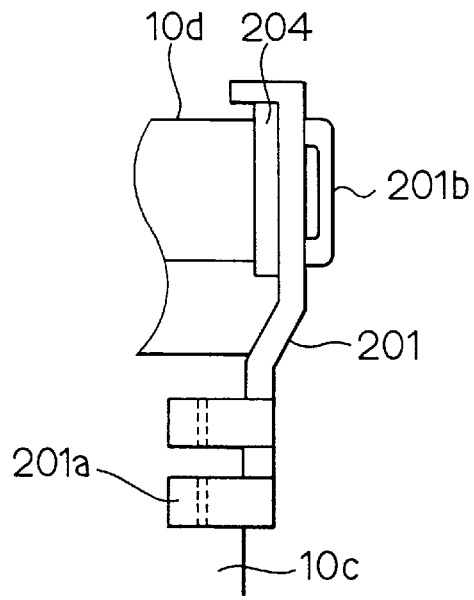
FIG. 18 is a side view illustrating a variation of a hold member.

A variation of the hold member 200 is shown in FIG. 18. The leaf spring 202 is replaced with a rubber member 204.

Figure 19A:
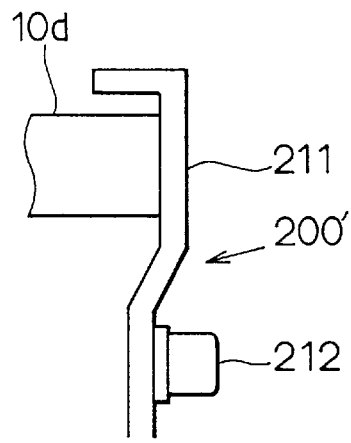
FIGS. 19A and 19B are a side view and a front view illustrating another variation of the hold member.
Figure 19B:
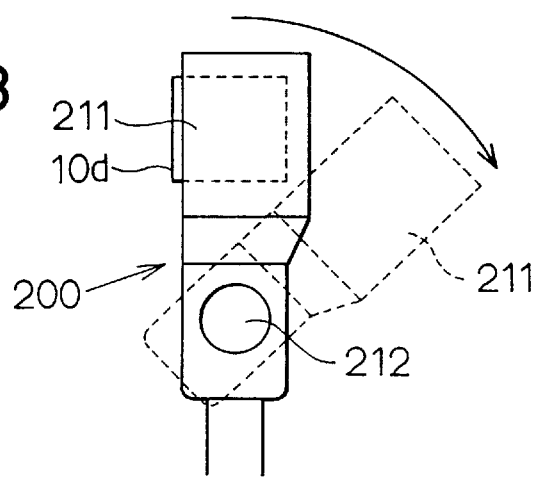

Another variation of the hold member 200 is shown in FIGS. 19A and 19B.

This hold member 200, is composed of a leaf spring 211 and a screw bolt 212. A lower end of the leaf spring 211 is rotatably fixed to a side portion of the light conducting plate 10c by the screw bolt 212 to normally press an end of the reflector 10d as shown in FIG. 19A. When the lamp 10b and the reflector 10d are to be removed, the leaf spring is turned as shown in FIG. 19B.

Fifth Embodiment

A fifth embodiment of the present invention is described with reference to FIGS. 20A and 20B. The reflector 10d of the fourth embodiment is replaced with a reflector 10f in this embodiment.

The reflector 10f has a U-shaped cross section and is fixed to the circuit board 70 as shown in FIG. 20B. The reflector 10f has a pair of connector terminals 219e which extend inside the reflector 10f to detachably connect the terminal T1 of the lamp and the terminal H1 of the heater respectively. A connector 220 has a cylindrical connector body 221 and a pair of latches 222 having hooks 222a and extending longitudinally from the connector body 221. A pair of connector terminals 223 extend in the connector body 221 from the bottom wall thereof.

When the connector body 221 is moved to the left side of the reflector 10f as shown in FIG. 20A, the latches 222 are inserted into engagement holes 219f. At the same time a pair of connector terminals 223 are detachably connected to the terminal T2 of the lamp 10b and the terminal H2 of the heater H. In this embodiment, the connection strength of the connector terminal 223 is set to be stronger than the connection strength of the connector terminals 219e. The connector terminals 223 are connected to the circuit board 70 by a connector 224 as shown in FIG. 20B.

Other portions are substantially the same as those of the fourth embodiment.

When the lamp 10b and the reflector 10f are to be removed, press both latches by fingers to disengage the hooks from the engagement holes 219f and pull the connector body 221 out of the casing 60 through the opening 61a. The terminals T1 and H1 are removed from the connector terminals 219e first.

After removing the connector 224 from the circuit board 70, the lamp 10b and the connector 220 are pulled out of the casing 60 through the opening 61a, and the connector terminals 223 are removed from the terminals T2 and H2.

Figure 21:
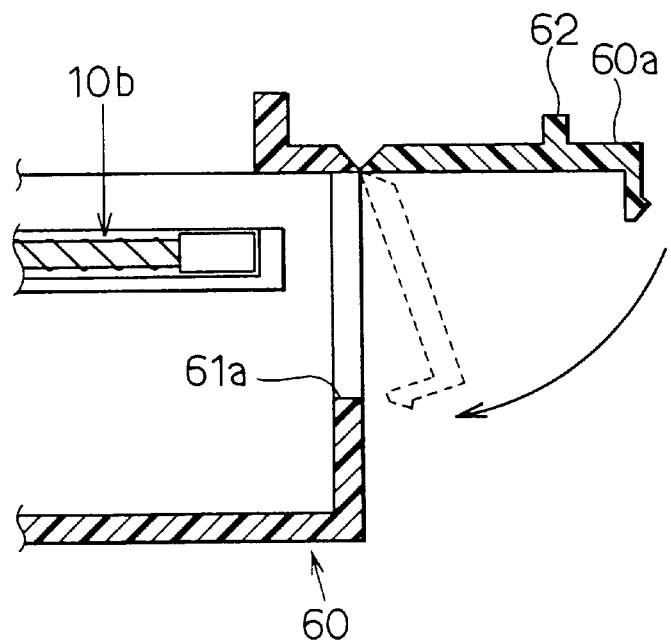
FIG. 21 is a variation of a casing of the indicating instrument according to the embodiments of the present invention.

A variation of the above embodiment is shown in FIG. 21. A cover member 60a having a knob 62 is formed on the casing 60 to cover the opening 61a.

Figure 22:
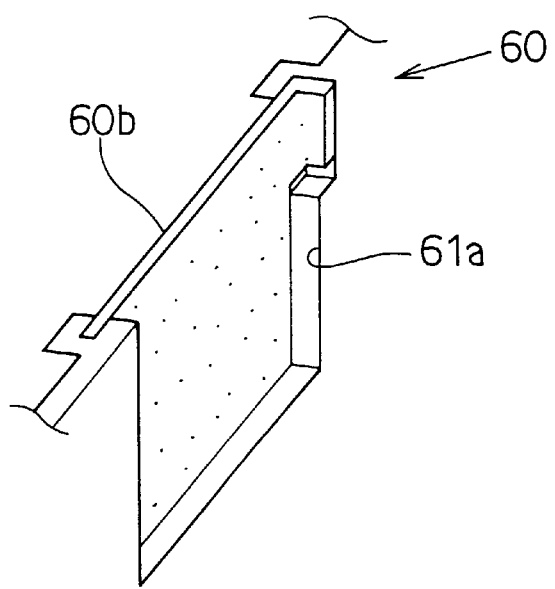
FIG. 22 is a perspective view illustrating another variation of the casing.

Another variation of the fifth embodiment is shown in FIG. 22. A filter member 60b is detachably disposed in a groove formed along the inner periphery of the opening 61a.

Figure 23A:
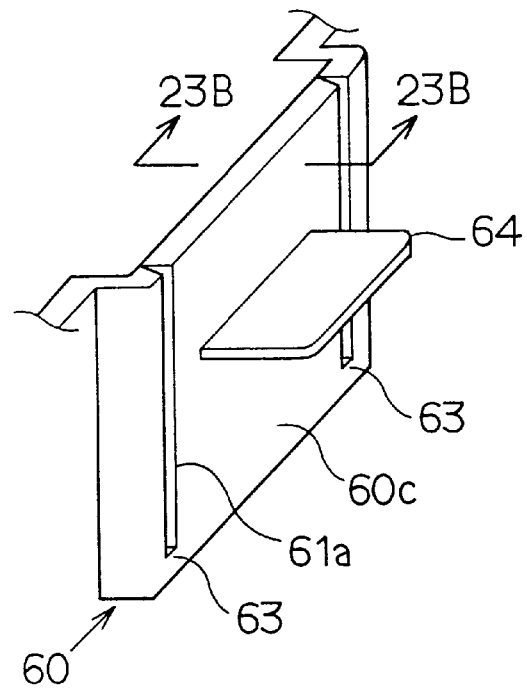
FIGS. 23A, 23B and 23C are perspective and cross-sectional views illustrating other variations of the casing.
Figure 23B:
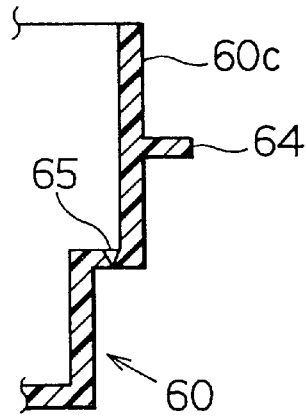
Figure 23C:
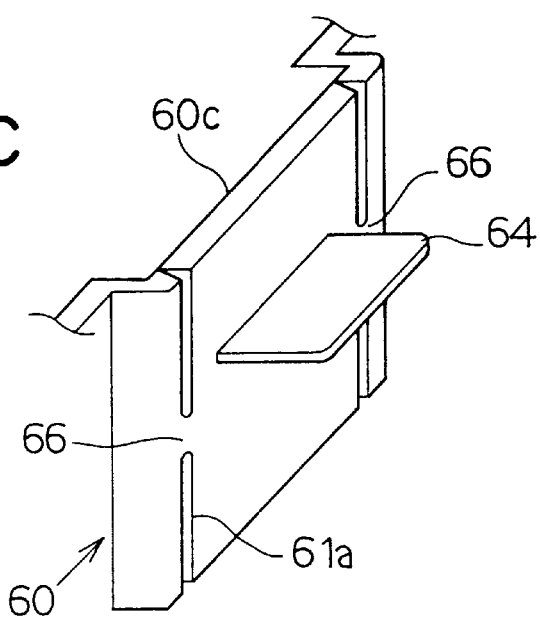

Other variations are shown in FIGS. 23A, 23B and 23C.

The opening 61a of this embodiment is covered by an integrated cover member 60c which is generally surrounded by V-shaped grooved portions 63 as shown in FIG. 23A or grooved portions 65 as shown in FIG. 23B, which is a cross-sectional view cut along a line indicated by arrows 23B in FIG. 23A. The integrated cover member 60c can be formed by cutting the casing 60 except for connecting portions 66 as shown in FIG. 23C. The cover member 60c shown in FIGS. 23A, 23B and 23C has a handle 64 so that the cover member 60c can be torn off along the grooved portions 63 or 65 or at the connecting portions 66 by pulling the handle 64.

The covers and filter member described above are not only effective to prevent foreign particles from entering the interior of the case 60 but also add a fine appearance of the case.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An indicating instrument for a vehicle, said instrument comprising:

a casing;

a longitudinally extending dial plate fixed in place relative to said casing, said dial plate having a plurality of indicating gauges disposed on a front surface thereof;

a light source disposed to extend in the longitudinal direction of said dial plate;

a light conducting plate disposed on the back surface of said dial plate, said light conducting plate having a light incidence surface facing said light source; and a reflector, for reflecting light of said light source to said light incidence surface of said light conducting plate, detachably fixed to said casing.

2. An indicating instrument as claimed in claim 1, wherein said first member comprises a pair of forked clamps.

3. An indicating instrument as claimed in claim 1 further comprising a circuit board detachably fixed to said reflector.

4. An indicating instrument as claimed in claim 1, wherein said casing has a slit, and said second member comprises a claw member in engagement with said slit of said casing.

5. An indicating instrument as claimed in claim 4, wherein said casing has a longitudinal conduit, and said reflector is disposed in said conduit.

6. An indicating instrument as claimed in claim 1, wherein said light source comprises a tubular lamp, a heater disposed on said lamp, a thermosensitive element disposed near said heater and a switch connected to said heater, and a temperature of said heater is controlled by said switch.

7. An indicating instrument as claimed in claim 6, wherein said switch is fixed to said reflector.

8. An indicating instrument as claimed in claim 6, wherein power supplied to said heater is cut by said switch when said thermosensitive element detects that said temperature of said heater is in a normal condition.

9. An indicating instrument as claimed in claim 1 further comprising:

a high-voltage-power source and a connector, wherein said connector has a terminal plate connecting said light source to said high-voltage source and other terminal plates, and said terminal plate connecting said light source to said high-voltage-power source is disposed at a distance large enough to insulate said terminal plate connecting said light source to said high-voltage-power source from other terminal plates.

10. An indicating instrument as claimed in claim 9, wherein:

said connector comprises an insulating member having a plurality of grooves, one of which is disposed at an interval large enough to insulate a terminal plate from other terminal plates, and said terminal plate connecting said light source to said high-voltage power source is disposed in said one of said plurality of grooves.

11. An indicating instrument for a vehicle, said instrument comprising:

a casing;

a longitudinally extending dial plate fixed in place relative to said casing, said dial plate having a plurality of indicating gauges disposed on a front surface thereof;

a light source disposed to extend in the longitudinal direction of said dial plate; and a reflector, disposed in said casing, for accommodating said light source and reflecting light of said light source to said dial plate;

wherein said casing comprises a first member for detachably fixing said reflector to be removed in the longitudinal direction of said dial plate, and said casing has an opening for allowing said reflector and said light source to pass therethrough when they are removed from said case in the longitudinal direction of said dial plate.

12. An indicating instrument as claimed in claim 11 further comprising a longitudinally extending circuit board detachably fixed to said reflector and connected to said lamp so that said reflector, light source and circuit board can pass through said opening when they are removed from said casing.

13. An indicating instrument as claimed in claim 11 further comprising a cover member adapted to cover said opening.

14. An indicating instrument as claimed in claim 1, said reflector comprising:

a first member for detachably holding said light source; and a second member detachably fixed to said casing.

15. An indicating instrument as claimed in claim 11, said reflector comprising a second member for detachably holding said light source.

16. An indicating instrument for a vehicle, said instrument comprising:

a dial plate;

a longitudinally extending discharge lamp having a heater;

a light conducting plate disposed on the back surface of said dial plate, said light conducting plate having a light incidence surface facing said discharge lamp;

a reflector for reflecting light of said discharge lamp to said light incidence surface, said discharge lamp being fixed to said reflector; and a thermosensitive power supply circuit for supplying electric power to said heater according to a temperature of said discharge lamp.

17. An indicating instrument as claimed in claim 16, wherein:

said thermosensitive power supply circuit comprises a thermosensitive element disposed near said discharge lamp, a battery and a switch connected between said battery and said heater, and said switch is controlled by said thermosensitive element.

18. An indicating instrument as claimed in claim 16, wherein said switch is fixed to said reflector.

* * * * *